US008131410B2

(12) United States Patent
Nikolic et al.

(10) Patent No.: US 8,131,410 B2
(45) Date of Patent: Mar. 6, 2012

(54) QUIET CLIMB CREW INTERFACE

(75) Inventors: Mark I. Nikolic, Seattle, WA (US);
Barbara E. Holder, Seattle, WA (US)

(73) Assignee: The Boeing Company, Chicago, IL (US)

( * ) Notice: Subject to any disclaimer, the term of this patent is extended or adjusted under 35 U.S.C. 154(b) by 898 days.

(21) Appl. No.: 11/764,136

(22) Filed: Jun. 15, 2007

(65) Prior Publication Data

US 2008/0312781 A1      Dec. 18, 2008

(51) Int. Cl.
*G05D 1/00* (2006.01)
(52) U.S. Cl. ............ 701/15; 701/14; 244/180; 244/181; 244/182
(58) Field of Classification Search ..................... 701/14, 701/15, 16; 244/180–188
See application file for complete search history.

(56) References Cited

U.S. PATENT DOCUMENTS

| 4,019,702 | A | | 4/1977 | Annin | |
|---|---|---|---|---|---|
| 4,792,906 | A | * | 12/1988 | King et al. | 701/5 |
| 5,299,765 | A | | 4/1994 | Blechen | |
| 5,445,021 | A | * | 8/1995 | Cattoen et al. | 73/178 R |
| 5,695,156 | A | * | 12/1997 | Firuz et al. | 244/180 |
| 6,577,947 | B1 | * | 6/2003 | Kronfeld et al. | 701/202 |
| 6,691,030 | B2 | | 2/2004 | Winikka | 701/206 |
| 6,892,118 | B1 | * | 5/2005 | Feyereisen | 701/14 |
| 6,904,340 | B2 | * | 6/2005 | Andre et al. | 701/14 |
| 7,366,591 | B2 | * | 4/2008 | Hartmann et al. | 701/4 |
| 2005/0178903 | A1 | * | 8/2005 | Boorman et al. | 244/118.5 |
| 2005/0203675 | A1 | * | 9/2005 | Griffin et al. | 701/3 |
| 2005/0261810 | A1 | | 11/2005 | Artini et al. | |
| 2009/0132107 | A1 | * | 5/2009 | DeJonge | 701/15 |

FOREIGN PATENT DOCUMENTS

GB          965276        7/1964

OTHER PUBLICATIONS

J. Friedrich, D. McGregor and D. Weigold, "Quiet Climb System," Boeing Aero, vol. 21, pp. 26-31, First-Quarter, 2003. [Online serial]. Available: http://www.boeing.com/commercial/aeromagazine/aero_21/aero_21.pdf. [Accessed Mar. 27, 2010].*
U.S. Appl. No. 11/559,782, filed Nov. 14, 2006, K. Burnside.
UK Search and Examination Report for Application GB0808978.1, mailed on Sep. 12, 2008, 25 pgs.

* cited by examiner

*Primary Examiner* — Thomas Black
*Assistant Examiner* — Peter D Nolan
(74) *Attorney, Agent, or Firm* — Caven & Aghevli LLC (57) ABSTRACT

In accordance with an embodiment, a method includes displaying information corresponding to automatically controlled engine thrust levels during a reduced engine thrust period of flight of an aircraft. The information corresponds to one or more parameters associated with a flight control computer of the aircraft. In an alternate aspect, the displayed information includes alphanumeric information formatted in accordance with a sequential order of the automatically controlled engine thrust levels. In a further aspect, the alphanumeric information corresponds to first, second and third engine thrust levels.

16 Claims, 6 Drawing Sheets

QUIET CLIMB CREW INTERFACE

FIELD OF THE INVENTION

The field of the present disclosure relates to aircraft thrust control systems, and more specifically, to providing a flight crew interface for engine thrust control during noise abatement procedures.

BACKGROUND OF THE INVENTION

Aircraft noise abatement procedures are mandated under applicable local and/or Federal Aviation Administration (FAA) rules. Such noise abatement is directed to reducing the level of aircraft engine noise present at ground level during takeoff and landing maneuvers. Typically, noise reduction parameters vary with location in accordance with residential housing density, wildlife protection areas, and other factors in proximity to a particular airport. As a general rule, the higher the population density and incidence of nearby wildlife, the greater the noise reduction goals required by applicable rule.

It is known to reduce engine thrust during takeoff once the aircraft reaches a predetermined altitude above ground, and then restore engine thrust to (about) full power after climbing to a higher predetermined altitude. Such a procedure is referred to herein as "quiet climb". In this way, engine noise at ground level is markedly reduced as compared to that which occurs during a full-thrust climbing maneuver. Compliance verification proximate to an airport or other facility is generally handled via ground-based instrumentation managed by a local or federal authority.

The manipulation of engine thrust for noise abatement can be handled manually by the flight crew. However, takeoff and landing periods place significant other burdens on the pilot and co-pilot, requiring their peak attention to matters around the aircraft, weather conditions, local air traffic density, etc. Flight safety is always of paramount concern to any commercial flight crew. In response to these and other factors, some aspects of thrust reduction and restoration procedures incident to noise reduction have been automated in some aircraft by way of their respective flight control computer systems.

While such automation frees the flight crew to be concerned with other matters, improvements are needed in regard to user access and real-time feedback before and during flight operations. For example, flight crews often desire real-time information about the quiet climb operating period. Such information would help a flight crew to anticipate normal changes in engine operation and reduce the stress of managing the aircraft during crucial flight periods. Therefore, novel systems and methods for improved flight crew interface with quiet climb automation systems would have great utility and enhance safety.

SUMMARY

Embodiments of flight crew interfaces in accordance with the present disclosure provide for alphanumeric and graphical display of information related to automatic engine thrust control aboard an aircraft. The displayed information relates to reduced engine thrust level flight, as typically performed during takeoff and landing under noise abatement regulations. Crew interface pages and displays are formatted to be intuitive and immediately understood, thus providing real-time feedback and increasing overall flight safety.

In one embodiment, a method includes displaying information that corresponds to automatically controlled engine thrust levels during a reduced engine thrust period of flight of an aircraft. In turn, the information corresponds to one or more parameters that are associated with a flight control computer of the aircraft.

In another embodiment, one or more computer-readable storage media include a program code. The program code is configured to cause a flight control computer of an aircraft to display alphanumeric information, including one or more parameters of a sequence of automatically controlled engine output levels. The program code is also configured to cause the flight control computer to store the one or more parameters. Additionally, the program code is configured to cause the flight control computer to store a change to at least one of the parameters in accordance with user input to the flight control computer. Furthermore, the program code is configured to cause the flight control computer to display graphical information corresponding to the sequence of automatically controlled engine output levels, wherein the graphical information is plotted along a planned path of travel for the aircraft.

In yet another embodiment, a flight control computer is configured to display information related to automatically controlled engine thrust levels during a reduced engine thrust level period of flight of an aircraft. In turn, the information corresponds to one or more parameters stored in the flight control computer.

The features, functions, and advantages that are discussed herein can be achieved independently in various embodiments of the present invention or may be combined various other embodiments, the further details of which can be seen with reference to the following description and drawings.

BRIEF DESCRIPTION OF THE DRAWINGS

Embodiments of systems and methods in accordance with the teachings of the present disclosure are described in detail below with reference to the following drawings.

DETAILED DESCRIPTION

The present disclosure introduces crew interface pages and displays related to automatic engine control of an aircraft. Many specific details of certain embodiments of the invention are set forth in the following description and in FIGS. 1-7 to provide a thorough understanding of such embodiments. One skilled in the art, however, will understand that the invention may have additional embodiments, or that the invention may be practiced without several of the details described in the following description.

Figure 1:
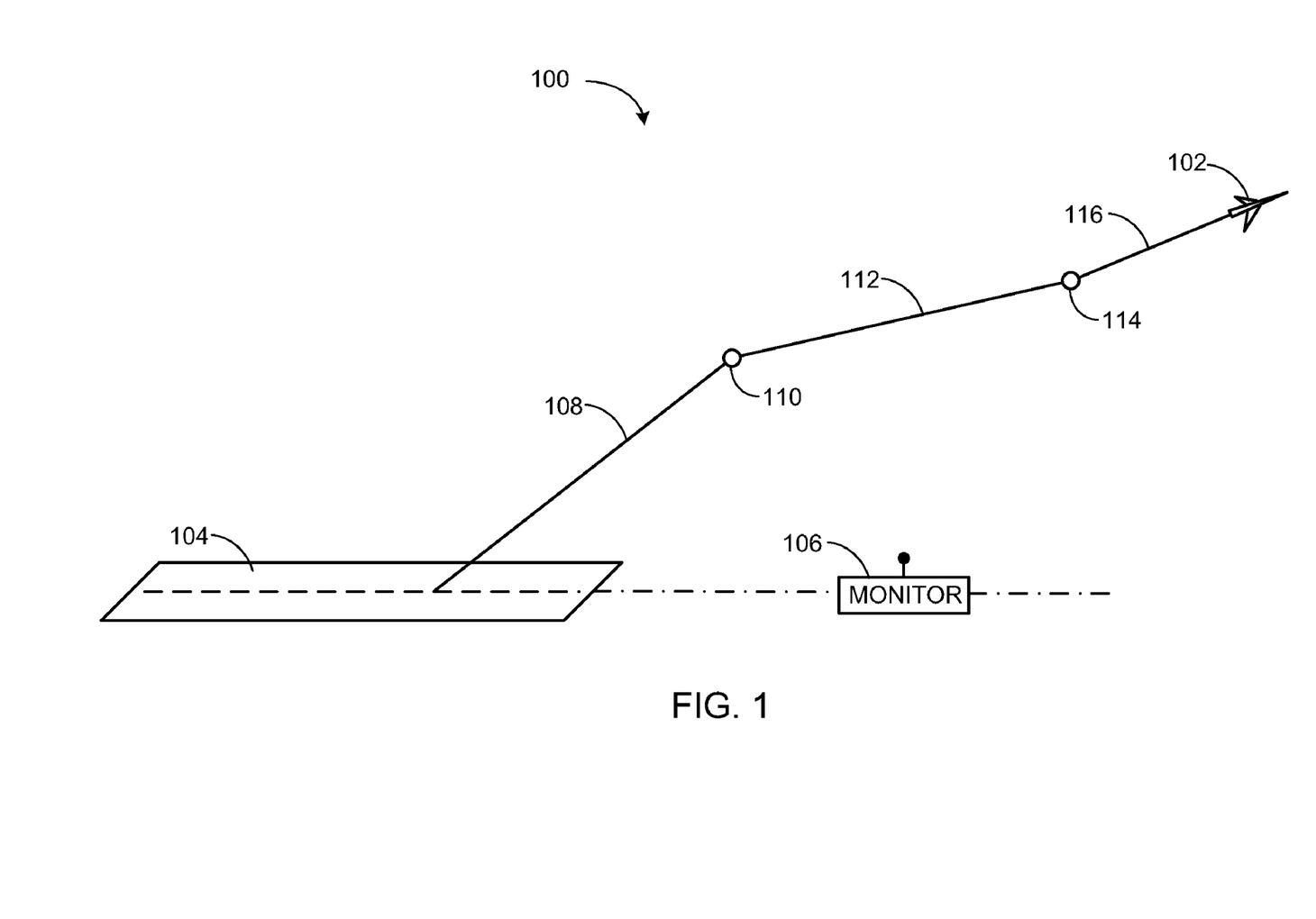
FIG. 1 is an elevation perspective view depicting an operational context according to an embodiment of the invention.

Operational Context of the Invention: FIG. 1 is an elevation perspective view depicting one usage environment 100 according to an embodiment of the present invention. An aircraft 102 is shown taking off from a runway 104. Noise, predominantly generated by the engines of the aircraft 102, is monitored for regulatory compliance by a ground-based monitor station 106. In order to comply with noise reduction (i.e., abatement) regulations, the aircraft 102 performs its takeoff maneuver using a sequence of engine thrust-control stages.

A first stage 108 of takeoff begins as the aircraft 102 leaves the runway 104. At this time, the aircraft 102 engines (not shown) are typically operating at or about full output thrust, or full-power. This full-power stage 108 continues until the aircraft 102 reaches a point 110 along its flight path. At point 110, the output thrust of the aircraft 102 engines is reduced by some amount and a second stage 112 of flight begins. For purposes of example, it is assumed that engine output is reduced to eighty-eight percent (i.e., 0.88) of full power. This second stage 112 is referred to as a "quiet climb" period of flight for purposes herein. It is noted that the quiet climb 112 phase of flight occurs generally over the monitor station 106.

Quiet climb 112 continues to a point 114 in the flight path, at which time engine thrust of the aircraft 102 is restored to (or near) full-power. The aircraft 102 then continues a substantially full-power climbing phase 116 that lasts, typically, until the aircraft 102 reaches cruising altitude and assumes a level flight orientation.

The respective points 110 and 114 are usually determined before takeoff while the aircraft 102 is on the ground. These points 110 and/or 114 may be based on altitude above ground level (i.e., height), or may be related to the location of the aircraft 102 along it flight path. Typically, such location-based points 110 and/or 114 correspond to some proximity to the monitor station 106. Other considerations can also be used to determine where points 110 and/or 114 occur along the flight path of the aircraft 102.

A flight control computer of the aircraft 102 may be programmed, prior to takeoff, with some number of parameters corresponding to the quiet climb mode of operation of the aircraft. Such parameters can include, for example, the height and/or location of the reduced thrust point 110 and the restored thrust point 114, the respective engine thrust levels used during phases 108, 112 and 116 of the flight, whether or not a "washout" mode of engine control is to be used, etc. Washout refers to a smooth and gradual restoration of full-power engine thrust between points 110 and 114. In another scenario, the onset of reduced thrust at point 110 may be rather abrupt, with another rapid transition to full-power at point 114. Other engine thrust modulation schemes may also be used. In any case, engine thrust is suitably and automatically controlled between points 110 and 114 such that a quiet climb, noise-abatement takeoff maneuver of the aircraft 102 is performed.

Figure 2:
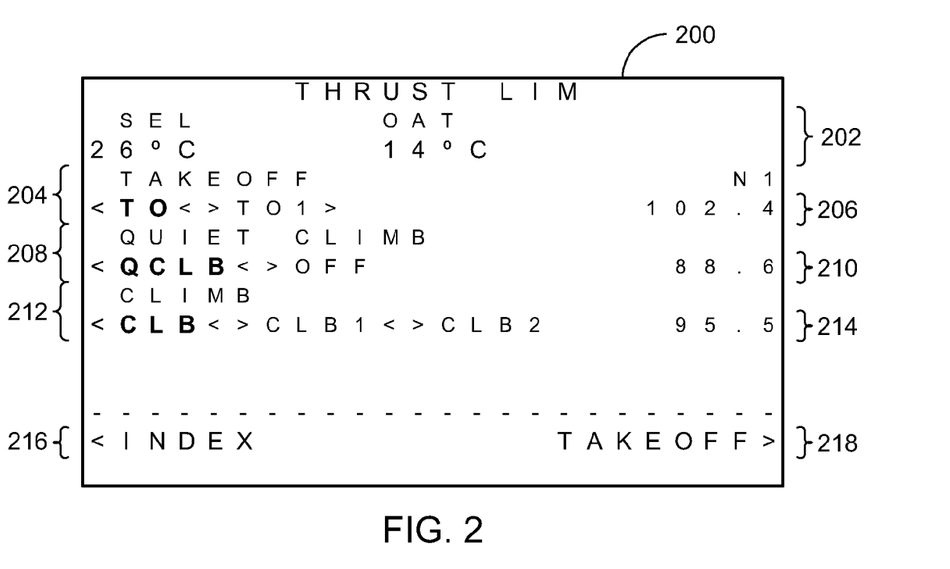
FIG. 2 is an elevation view depicting an operator interface page according an embodiment of the invention.

Exemplary User Interface Pages: FIG. 2 is an elevation view depicting an operator interface page 200 according to an embodiment of the invention. The page 200 is exemplary of any number of pages that can be displayed by way of a control display unit (CDU) coupled to a flight control computer (not shown) of an aircraft. The page 200 includes alphanumeric (textual) content generated by a flight control computer and corresponding to programming and parameters stored therein.

The page 200 permits an operator (i.e., flight crew member) to view and input or change parameters related to automatic control of engine thrust levels during a quiet climb takeoff operation. Other information, such as environmental conditions 202, can also be displayed via the page 200. The page 200 of FIG. 2 depicts a general, two-column format presented in accordance with the sequence of engine thrust control stages that will be performed during takeoff. The page 200 includes first stage labeling 204 and a corresponding engine thrust parameter 206 that is presented as a percentage of engine full rated power. The labeling 204 and thrust parameter (or value) 206 correspond to a first stage of engine control during takeoff that is analogous to the first stage 108 of FIG. 1.

The page 200 of FIG. 2 also includes second stage labeling 208 and a corresponding engine thrust parameter 210. The information 208 and 210 are associated with a quiet climb phase of flight, analogous to the second stage 112 of FIG. 1. The page 200 of FIG. 2 further includes third stage labeling 212 and a corresponding engine thrust parameter 214. The information 212 and 214 are associated with a final climbing phase of flight, analogous to stage 116 of FIG. 1. In this way, the page 200 of FIG. 2 presents information and parameters in a vertical listing that corresponds to the time-sequence of engine thrust operations during a quiet climb takeoff procedure. The page 200 further includes labeling 216 and 218 indicative of other CDU pages that an operator can move to (i.e., electronically select) during information viewing and input to the flight control computer. Such moving or selection of CDU pages is typically performed by way of pushbuttons located adjacent to the CDU display itself.

The page 200 of FIG. 2 can also be displayed to bring attention to certain element or pieces of information displayed thereon. In one embodiment, the three general stages of quiet climb takeoff are accentuated by bold and/or distinctly colored text. In the case of page 200, takeoff "TO", quiet climb "QCLB" and final climb "CLB" can be presented, for example, as bold, green text on a black background of the CDU, wherein the rest of the information and/or parameters are presented in a white, non-bold font. In another embodiment, a bold and/or green font is used to indicate a section or parameter that is presently selected by a user for changing and storing within the flight control computer. Other embodiments of page 200 that use other colors, boldness and/or font characteristics can also be used. In any case, the page 200 is configured to permit user access and display of automated aircraft engine control information in an intuitive and easy-to-use manner.

Figure 3:
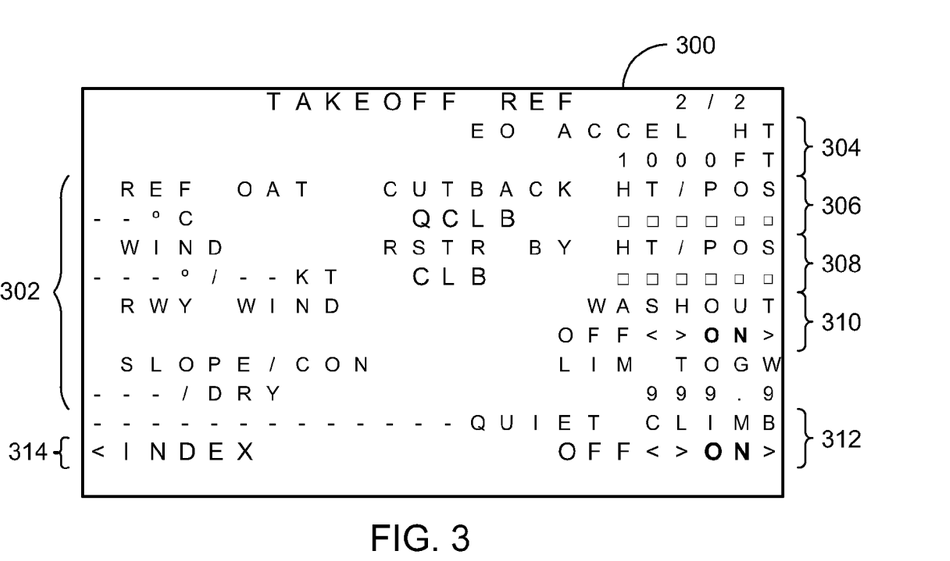
FIG. 3 is an elevation view depicting another operator interface page according an embodiment of the invention.

FIG. 3 is an elevation view depicting an operator interface page 300 according to another embodiment of the invention. The page 300 is exemplary of another page that can be displayed by way of a control display unit (CDU) of an aircraft. The page 300 includes alphanumeric environmental information 302. Other types of information and parameters can also be displayed.

The page 300 also includes labeling and parameters 304 pertaining to a minimum altitude above ground level (AGL) at which engine thrust reduction can be initiated. Page 300 also includes labeling and parameter placeholders 306 corresponding to a height or location (latitude/longitude, etc.) where quiet climb engine thrust reduction is to begin. The placeholders 306 of FIG. 3, depicted as empty squares (□), indicates that user input is needed to specify the value of that parameter. In one or more embodiments, a default value can be initially provided (e.g., 1000 feet AGL, etc.). The height or location parameter 306 is analogous to the point 110 of FIG. 1. The page 300 of FIG. 3 further includes labeling and parameter placeholders 308 corresponding to a height or location (latitude/longitude, etc.) where engine thrust restoration is to occur. The height or location parameter 308 is analogous to the restored thrust point 114 of FIG. 1.

Page 300 of FIG. 3 further includes a washout parameter 310. In this embodiment, the washout parameter 310 is depicted as an "Off/On" decision to the flight crew member accessing the page 300. If washout is selected "On", then a gradual restoration of engine power back to the user-specified final climbing power is performed by way of the flight control computer. The final climbing power (engine thrust percentage) is specified by way of parameter 214 of FIG. 2, for example. The page 300 also includes text labeling and parameter 312 indicating whether or not quiet climb operation has been selected. As depicted in FIG. 3, quiet climb is selected "ON". In another operational scenario, however, quiet climb can be selected "OFF", wherein the parameters 306 and 308 above would not be presented to a user, or would optionally be set to equal default values. The page 300 also includes labeling 314 indicative of another CDU page that an operator can move to during access to the flight control computer.

Page 300 of FIG. 3 can employ color, boldness and/or other font characteristics similar to those described above in regard to page 200 of FIG. 2. In some embodiments, such consistency is desirable for ease of use and familiarity by the flight crew accessing the pages of the flight control computer. This facilitates ready selection and input of parameter values that are stored in the flight control computer and used during automatic control of engine thrust during a quiet climb flight procedure. It is to be understood that one or more of the parameters prescribing a quiet climb takeoff procedure can be provided to the flight control computer via communication with another computer or entity external to the aircraft. For example, height and/or location parameters 306 and 308 of FIG. 3 can be wirelessly transmitted to the flight control computer during pre-flight operations, and displayed for viewing and verification to the flight crew.

The pages 200 and 300 of FIGS. 2 and 3 are exemplary of any number of embodiments of user interface configuration that can be used in accordance with the invention. As shown, typically alphanumeric (i.e., textual) information is presented and input via the pages 200 and 300 prior to takeoff in an intuitive and readily understood format. However, the invention is also concerned, among other things, with presenting information to the flight crew in predominantly graphical format. Such graphical displays provide an extra measure of understanding prior to flight, and enable the flight crew to anticipate normal engine thrust modulations during flight—particularly during the high workload periods of takeoff and landing.

Figure 4:
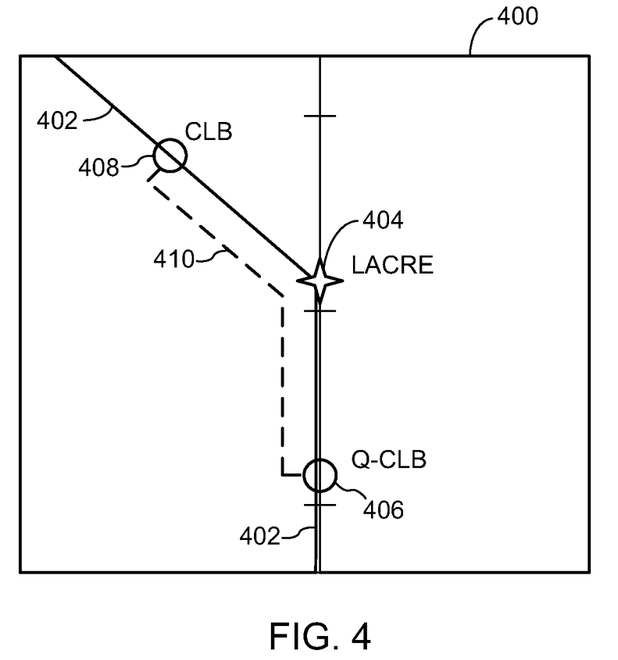
FIG. 4 is a plan view depicting a graphical display according an embodiment of the invention.

Exemplary Graphical Displays: FIG. 4 is an elevation view depicting an exemplary graphical display 400 according to another embodiment of the invention. The graphical display 400 is typically provided to a user by way of a navigation display coupled to a flight control computer of an aircraft. The graphical display 400 is dynamic in nature and changes with time so as to represent progress during flight. The graphical display 400 includes a planned flight path 402 depicted in plan view. The flight path 402 is indicative of a pre-programmed flight plan as entered and stored in a flight control computer of an aircraft. The graphical display 400 also includes a labeled waypoint 404. Waypoints such as 404 are commonly used in aircraft navigation and are familiar to one skilled in the art.

The graphical display 400 further includes a labeled quiet climb node 406. The quiet climb node 406 is indicative of the beginning of reduced engine output thrust relative to the flight path 402. Graphical display 400 also includes a labeled climb node 408. The climb node 408 is indicative of the ending of reduced engine output thrust relative to the flight path 402. In this way, the nodes 406 and 408 are analogous to the points 110 and 114, respectively, of FIG. 1. The graphical display 400 further includes an indicator line 410 that links the nodes 406 and 408. The indicator line 410 parallels that portion of the flight path 402 corresponding to reduced engine thrust (quiet climb) flight operations.

The various graphical elements 402-410 of the graphical display 400 are depicted using particular indicia (i.e., symbols, textual labels and/or line types). However, it is to be understood that other symbols, text labels, fonts, and/or line types can also be used. Similarly, various colors can also be utilized. For example, quiet climb node 406 is depicted in FIG. 4 as a circle and associated text label "Q-CLB". In another embodiment, a quiet climb node could be depicted as a triangle, square, tick mark, "bug" or other symbol, with or without a corresponding text label. The indicator line 410 of FIG. 4 is depicted as a dashed line. In another embodiment, the indicator line 410 could be depicted as a locus of asterisks or dots, a solid colored bar parallel to the flight path 402, etc. In yet another embodiment, the indicator line 410 is not present, and that segment of the flight path 402 between the quiet climb node 406 and the climb node 408 is of a distinct color as compared to the remainder of the flight path 402. Other characteristics of the graphical elements 402-410 can also be used in accordance with the invention.

Figure 4A:
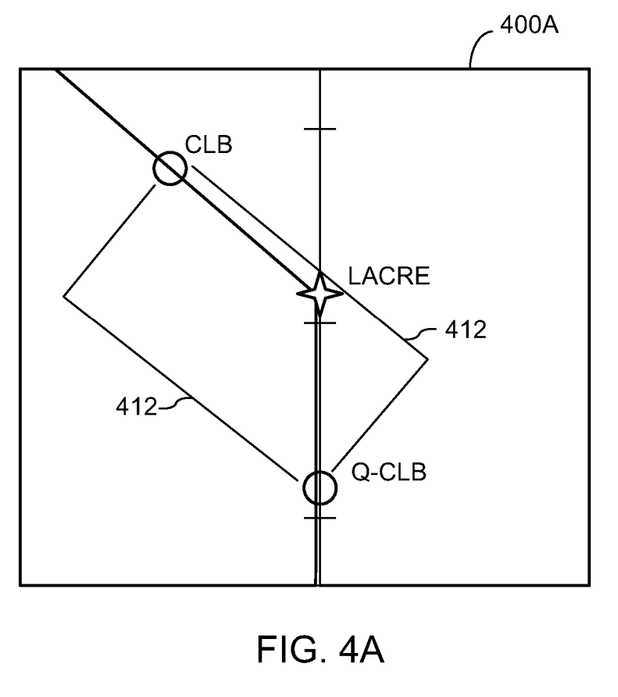
FIG. 4A is a plan view depicting another graphical display according an embodiment of the invention.
Figure 4B:
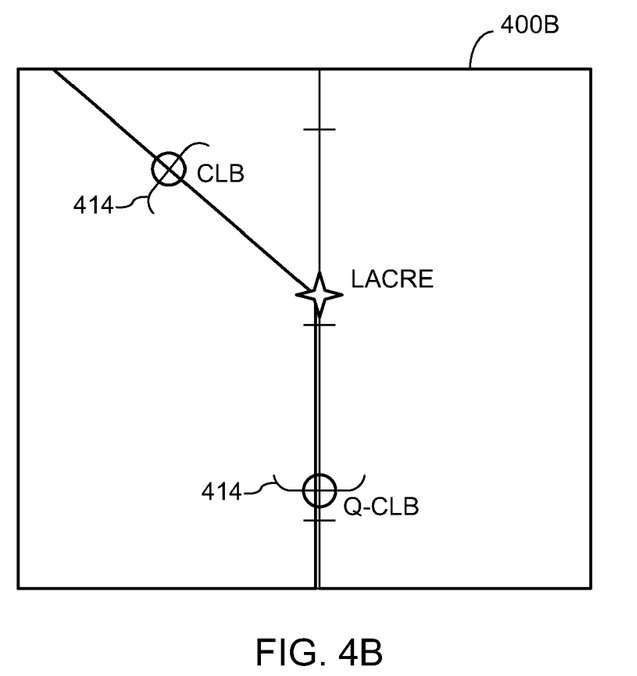
FIG. 4B is a plan view depicting still another graphical display according an embodiment of the invention.
Figure 4C:
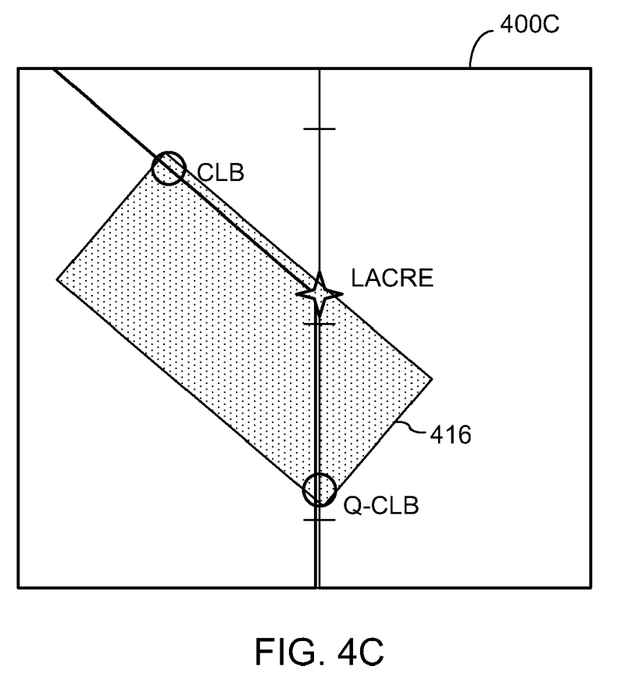
FIG. 4C is a plan view depicting yet another graphical display according an embodiment of the invention.

For example, FIGS. 4A-4C depict alternative embodiments of graphical displays 400A-400C, respectively, which are generally analogous to the graphical display 400 of FIG. 4. Graphical display 400A includes a rectangular arrangement of lines 412 to denote the range of reduced engine thrust (i.e., quiet climb flight) relative to the planned flight path. Graphical display 400B depicts respective end brackets 414 that visually emphasize the beginning and end nodes of quiet climb flight. In turn, graphical display 400C depicts a shaded rectangular region 416 corresponding to the range of quiet climb flight. The elements (i.e., indicia) 412-416 of FIGS. 4A-4C are illustrative and non-limiting. The use of other graphical elements and/or indicia is also contemplated by the invention.

Figure 5:
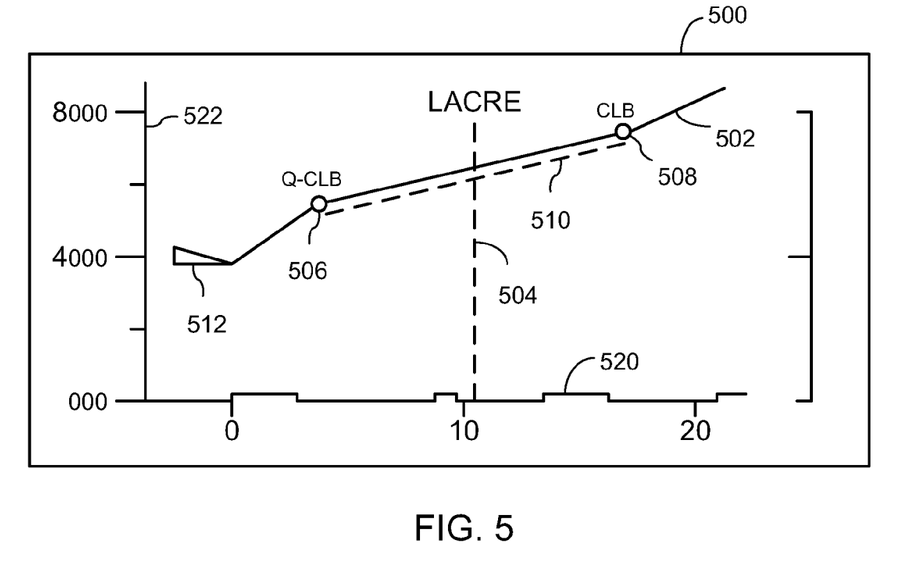
FIG. 5 is an elevation view depicting another graphical display according an embodiment of the invention.

FIG. 5 is an elevation view depicting an exemplary graphical display 500 according to another embodiment of the invention. The graphical display 500 is typically provided to a user by way of a vertical situation display coupled to a flight control computer of an aircraft. The graphical display 500 includes a flight path 502 depicted in side elevation view. The flight path 502 is indicative of a flight plan stored in a flight control computer of an aircraft. The graphical display 500 also includes a waypoint line 504 and associated waypoint label (in this case "LACRE").

The graphical display 500 also includes a labeled quiet climb node 506 and a labeled climb node 508. The quiet climb node 506 and the climb node 508 are analogous and correspond to the quiet climb node 406 and the climb node 408 of FIG. 4, as well as the points 110 and 114 of FIG. 1. The graphical display 500 further includes an indicator line 510 that links the nodes 506 and 508. The indicator line 510 parallels that portion of the flight path 502 corresponding to quiet climb flight operations.

The graphical display 500 of FIG. 5 also includes an aircraft symbol 512. The aircraft symbol 512 indicates the present location of the aircraft along the projected flight plan 502. Thus, the graphical display is understood to be dynamic in nature, changing with time during the course of the flight.

The graphical display 500 further includes a graduated ground level indication line 520 and a graduated altitude display line 522.

The respective elements 502-522 of the graphical display 500 are depicted by way of specific symbols, textual labels and/or line types. It is to be understood that other symbols, text labels, fonts, and/or line types can also be used. Similarly, various colors can also be utilized. Typically, matching symbols, labels, text and/or colors would be used for like elements in both of graphical displays 400 and 500 of FIGS. 4 and 5. For example, both the quiet climb nodes (406, 506) and the climb nodes (408, 508) can be depicted as green circles with respective green labels. Other matching characteristics of the graphical displays 400 and 500 can also be used.

The exemplary graphical displays 400-400C and 500 of FIGS. 4-5, respectively, present quiet climb-related information to a flight crew before and during flight operations. Such graphical presentations can include features such as waypoints, landmarks, topographical elevation lines, and other details. Graphics displays 400 and 500 allow a flight crew to anticipate predetermined and automatic changes in engine thrust during flight maneuvers. The anticipatory nature of these information displays reduces stress on the flight crew and permits the shifting of attention to other matters about the aircraft and adjacent airspace during critical times such as takeoff and landing. The graphical displays 400-400C and 500 of FIGS. 4-5 are exemplary and non-limiting in nature. The invention anticipates the configuration and user of displays including other information graphical content.

Figure 6:
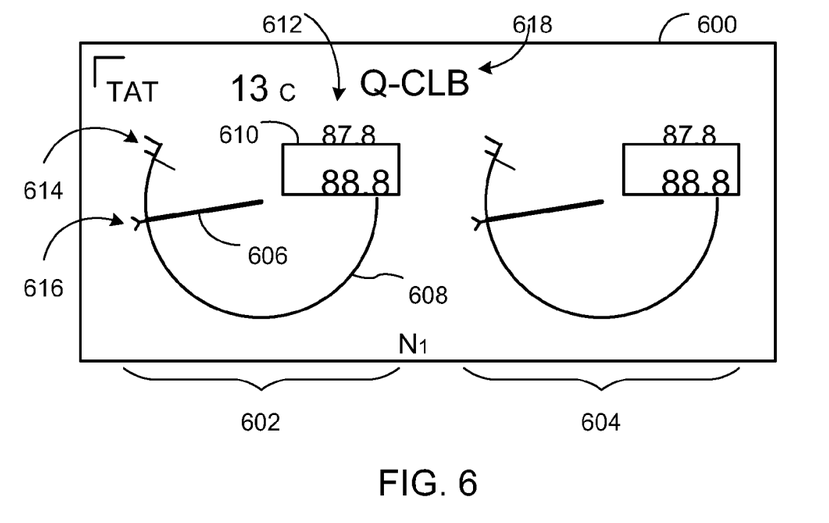
FIG. 6 is an elevation view depicting yet another graphical display according an embodiment of the invention.

FIG. 6 is an elevation view depicting an exemplary graphical display 600 according yet another embodiment of the invention. The graphical display 600 is typically provide by way of an engine indicator and crew alerting system (EICAS) display of an aircraft (e.g., 102 of FIG. 1). The graphical display 600 includes two engine thrust status displays 602 and 604, respectively. Each of the status display 602 and 604 corresponds to an engine of the associated aircraft and is substantially identical in graphical form and information content. Thus, only the status display 602 will be described in further detail—the status display 604 is understood to be essentially the same.

The status display 602 of FIG. 6 includes a present engine thrust output indicator needle 606 that indicates relative engine output (i.e., 0-100%) along a semicircular arc 608. The status display 602 also includes a numeric value 610. The numerical value 610 corresponds to the instantaneous output of the corresponding aircraft engine. Also included is a second numerical value 612. The second numerical value 612 corresponds to the present engine thrust control setpoint. As depicted in FIG. 6, there is a slight discrepancy between the engine thrust setpoint and the present output value (i.e., 88.8–87.8–1.0% of full scale difference).

The status display 602 also includes tick marks 614 along the semicircle 608 corresponding to maximum and/or overload (i.e., greater than 100% of rating) thrust values for the engine. The status display 602 further includes a marking, or "bug", along the semicircle 608 corresponding to the present engine thrust control setpoint. Furthermore, the graphical display 600 includes a quiet climb mode status indicator 618. The status indicator 618 can be removed or can read differently during non-quiet climb modes of operation (i.e., normal cruising flight, etc.).

Figure 7:
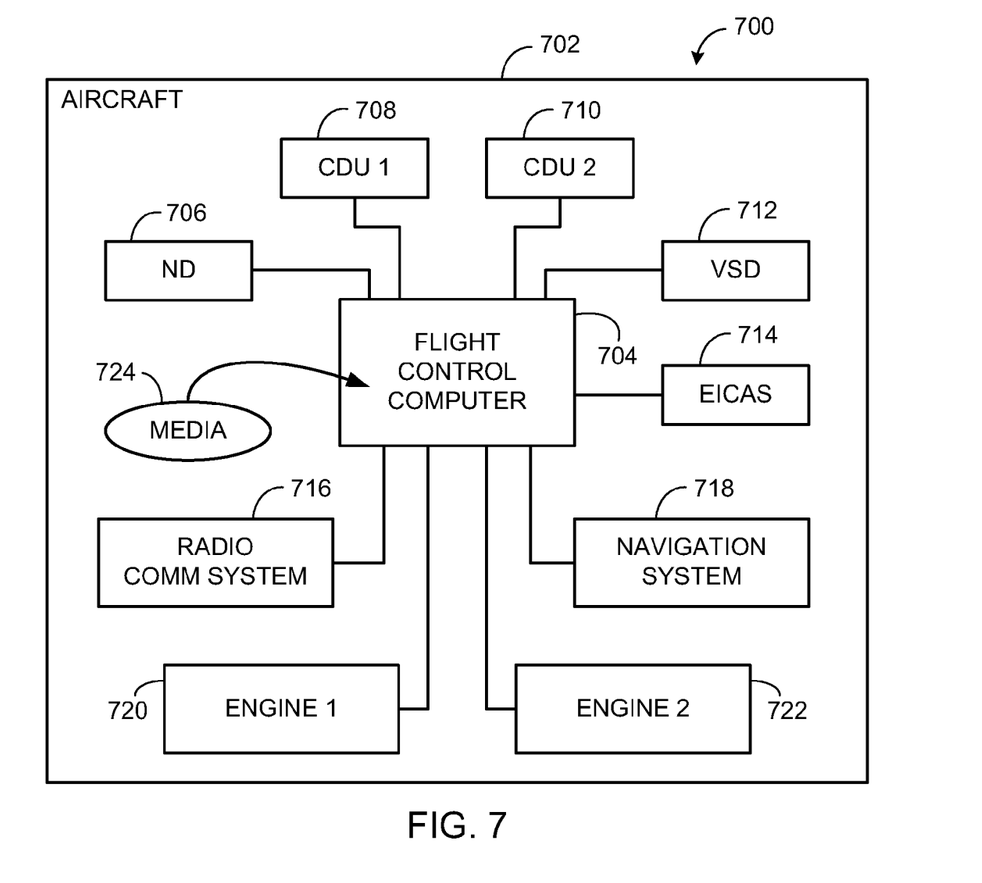
FIG. 7 is a schematic view of a system according to an embodiment of the invention.

Exemplary Systems: FIG. 7 is a schematic view of an example system 700 according to an embodiment of the invention. The system 700 includes an aircraft 702 having a flight control computer 704. The flight control computer 704 is coupled to a navigation display (ND) 706, first and second control display units (CDUs) 708 and 710, a vertical situation display (VSD) 712, an engine indicator and crew alerting system (EICAS) 714, a radio communications system (RCS) 716, a navigation system 718, and first and second engines 720 and 722. The flight control computer 704 is configured to communicate with and/or control various functions of the elements 706-722. Numerous normal operations performed by the flight control computer 704 are familiar to one of skill in the aeronautical engineering arts and need not be elaborated here. While particular elements 704-722 are depicted in FIG. 7, such elements are illustrative and non-limiting in nature. Other features and elements of the aircraft 702 can be present but are omitted in the interest of simplicity of understanding.

The flight control computer 704 is configured to display information via one or more of the ND 706, the first and second CDUs 708 and 710, the VSD 712 and ETCAS 714. In this way, the flight control computer 704 can provide any number of informational and/or graphical displays, including those exemplary pages and displays 200-600 as described in detail above. Furthermore, the flight control computer 704 is configured to control the thrust output levels of engine 720 and engine 722, respectively, during normal flight, as well as during quiet climb maneuvers in accordance with the descriptions above.

The flight control computer 704 can be programmed to provide the various displays and perform the control methods described herein by way of a program code included on one or more computer-readable or machine-readable storage media 724. Non-limiting examples of such machine-readable storage media 724 include a selectively removable CD-ROM, a DVD-ROM, a non-volatile solid state memory, a magnetic tape, a magnetic disk, or another suitable entity or entities. In one embodiment, a suitable program code is provided to the flight control computer 704 by way of wireless communication (e.g., via RCS 716, etc.), and stored within a solid state memory 724 of the flight control computer 704.

While specific embodiments of the invention have been illustrated and described herein, as noted above, many changes can be made without departing from the spirit and scope of the invention. Accordingly, the scope of the invention should not be limited by the disclosure of the specific embodiments set forth above. Instead, the invention should be determined entirely by reference to the claims that follow.

What is claimed is:

1. A method, comprising:
   determining engine thrust levels of an aircraft during a takeoff segment of a flight, the engine thrust levels to include an initial thrust level, a quiet climb thrust level, and a successive thrust level, the quiet climb thrust level being a reduced engine thrust period within the takeoff segment of the flight;
   displaying alphanumeric information corresponding to the engine thrust levels during the quiet climb thrust level, the alphanumeric information corresponding to one or more parameters associated with a flight control computer of the aircraft; and
   displaying, in a vertical situation display, graphical information corresponding to the takeoff segment of the flight, the graphical information including:
   a planned flight path based on the engine thrust levels, and
   a quiet climb graphical element superimposed on the planned flight path to indicate a beginning of the reduced engine thrust period within the takeoff segment of the flight.

2. The method of claim 1, wherein the graphical information further includes a rectangular arrangement of lines to indicate a range of reduced engine thrust period relative to the planned flight path.

3. The method of claim 1, wherein engine thrust levels further include a washout period between each of the engine thrust levels, the washout period being displayed in both the alphanumeric information and the graphical information.

4. The method of claim 1, further comprising displaying a graphical representation of the engine thrust levels for each engine adjacent to the alphanumeric information.

5. The method of claim 1, wherein the graphical information further includes a duration graphical element to indicate a duration of the reduced engine thrust period, the duration graphical element being graphically distinguishable from a portion of the displayed planned flight path preceding the quiet climb graphical element.

6. One or more computer-readable storage media including a program code, the program code configured to cause a flight control computer of an aircraft to:
  display alphanumeric information including one or more parameters of a sequence of automatically controlled engine thrust levels stored in the flight control computer, the sequence of automatically controlled engine thrust levels to include a quiet climb thrust level of the aircraft that occurs after an initial thrust level and before a successive thrust level, the quiet climb thrust level being a reduced engine thrust period within a takeoff segment of the flight;
  store a change to at least one of the one or more parameters in accordance with user input to the flight control computer, the one or more parameters to include a washout selector that enables a gradual transition between two sequential engine thrust levels; and
  display graphical information corresponding to a planned flight path of the aircraft based on the sequence of automatically controlled engine thrust levels, the graphical information including indicia to indicate a beginning, an end, and a duration of the reduced engine thrust period within the takeoff segment of the flight, the planned flight path displayed in a vertical situation and including a combination of textual and symbolic information.

7. The one or more computer-readable storage media of claim 6, wherein the program code is further configured such that at least one of the one or more parameters is provided to the flight control computer by way of communication with an entity external to the aircraft.

8. The one or more computer-readable storage media of claim 6, wherein the program code is further configured to display the alphanumeric information in a format corresponding to a sequential order of the automatically controlled engine thrust levels.

9. The one or more computer-readable storage media of claim 8, wherein the program code is further configured to display the alphanumeric information as two or more vertical columns.

10. The one or more computer-readable storage media of claim 6, wherein the one or more parameters further include a quiet climb selector to enable activation of the quiet climb thrust level, and wherein the quiet climb selector is activated when an origination airport requires use of the quiet climb thrust level.

11. The one or more computer-readable storage media of claim 10, wherein the program code is further configured such that:
  the indicia corresponding to the beginning of the reduced engine thrust period and the indicia corresponding to the end of the reduced engine thrust period are both displayed in a first color; and
  the planned flight path is displayed in a second color distinct from the first color.

12. The one or more computer-readable storage media of claim 11, wherein the program code is further configured such that the indicia corresponding to the duration of the reduced engine thrust level-period is displayed in the first color.

13. The one or more computer-readable storage media of claim 6, wherein the program code is further configured such that the alphanumeric information is displayed so as to indicate a user selection of one or more of the parameters by way of at least one of a change in color and a change in boldness of a font.

14. A flight control computer having instructions stored in memory and executable by one or more processors, the instructions, when executed, configured to:
  determine engine thrust levels of an aircraft between takeoff and cruising altitude, the engine thrust levels to include a quiet climb thrust level of the aircraft that occurs in sequence after an initial thrust level and before a successive thrust level, the quiet climb thrust level being a reduced engine thrust period of flight between the takeoff and the cruising altitude;
  display alphanumeric information related to engine thrust levels during the quiet climb thrust level, the alphanumeric information corresponding to one or more parameters associated with the flight control computer; and
  display graphical information corresponding to a planned flight path of the aircraft based on the engine thrust levels, the graphical information including indicia to indicate a beginning, an end, and a duration of the reduced engine thrust period of flight between the takeoff and the cruising altitude, the flight path displayed in a vertical situation and including a combination of textual and symbolic information.

15. The flight control computer of claim 14, wherein:
  the alphanumeric information is formatted so as to indicate a sequential order of the automatically controlled engine thrust levels; and
  the flight computer is further configured to receive changes to at least one of the one or more parameters by way of user input to the flight control computer.

16. The flight control computer of claim 14, wherein the graphical information includes graphical information corresponding to the automatically controlled engine thrust levels plotted with respect to the planned flight path.

* * * * *